(12) United States Patent  
Yamamoto

(10) Patent No.: US 7,441,445 B2  
(45) Date of Patent: Oct. 28, 2008

(54) SURFACE INFORMATION MEASURING APPARATUS AND SURFACE INFORMATION MEASURING METHOD

(75) Inventor: Hiroyoshi Yamamoto, Chiba (JP)

(73) Assignee: SII Nanotechnology Inc. (JP)

( * ) Notice: Subject to any disclaimer, the term of this patent is extended or adjusted under 35 U.S.C. 154(b) by 457 days.

(21) Appl. No.: 11/230,903

(22) Filed: Sep. 20, 2005

(65) Prior Publication Data

US 2006/0081040 A1      Apr. 20, 2006

(30) Foreign Application Priority Data

Oct. 20, 2004      (JP)      ............................ 2004-305402

(51) Int. Cl.  
*G01B 21/30*      (2006.01)

(52) U.S. Cl. ...................................... 73/105

(58) Field of Classification Search .................. 73/105; 250/306–307; 702/168  
See application file for complete search history.

(56) References Cited

U.S. PATENT DOCUMENTS 6,360,176 B1 *   3/2002   Nishioki et al. ............... 702/56  
7,288,762 B2 * 10/2007   Iyoki et al. .................. 250/306

FOREIGN PATENT DOCUMENTS

EP           790481 A1 *  8/1997  
JP         64000491 A  *  1/1989   ................. 28/220  
JP       2004004026 A  *  1/2004

* cited by examiner

*Primary Examiner*—Thomas P Noland  
(74) *Attorney, Agent, or Firm*—Adams & Wilks

(57) ABSTRACT

To measure surface information and physical information of a sample with high accuracy by promoting linearity in Z direction by nullifying cross talk in XY directions as less as possible, there is provided a surface information measuring apparatus including a probe having a stylus, a Z actuator fixed with the probe for being elongated and contracted in Z direction orthogonal to a sample surface B when applied with a voltage, an applicator for applying the voltage to the Z actuator, and a controller for controlling to operate the applicator, in which the Z actuator includes a piezoelectric member capable of being elongated and contracted in Z direction and a plurality of divided electrodes provided to be respectively electrically independent from each other in a state of being divided by at least 3 or more in a peripheral direction at an inner peripheral face or an outer peripheral face of the piezoelectric member for applying voltages to elongate and contract the piezoelectric member within ranges of contact regions, and the controller controls the applicator to apply voltages by a previously determined rates of voltage applying amounts such that elongating or contracting amounts of respective contact regions of the piezoelectric member respectively brought into contact with the divided electrodes respectively become the same.

9 Claims, 13 Drawing Sheets

IMAGE OBTAINED AT POSITION 1

IMAGE OBTAINED AT POSITION 2

BIASED CENTER CORE

OUT-OF-PERFECT CIRCLE

POLARIZATION IRREGULARITY

SURFACE INFORMATION MEASURING APPARATUS AND SURFACE INFORMATION MEASURING METHOD

BACKGROUND OF THE INVENTION

1. Field of the Invention

The present invention relates to a surface information measuring apparatus and a surface information measuring method for measuring shape information or various physical information (for example, dielectric constant, magnetized state, permeability, viscoelasticity and friction coefficient) of a surface of a sample. As specific surface information measuring apparatus, there are a scanning probe microscope, a surface roughness meter, a hardness meter and an electrochemical microscope.

2. Background Art

Heretofore, a probe microscope has been mainly used in observation of a surface of a sample by atomic level resolution and in recent years, the probe microscope is started to be used also in an industrial field of an optical disk or a semiconductor. Particularly, in the industrial field, there is requested a length measuring function of measurement of a stepped difference, measurement of a pitch or measurement of an angle and in order to meet the request, for example, there are carried out various improvements of using a hard material having an excellent linearity for a Z element, or improving linearity by integrating sensors for respective XYZ axes and feeding back sensor signals.

Here, although various ones of the above-described probe microscope have been provided, as one of them, there is known a probe microscope for moving a probe in XYZ directions by small amounts by a tube type piezoelectric scanner.

As show by, for example, FIG. 12, the probe microscope 60 is provided with a tube type piezoelectric scanner 63 comprising an XY scanning tube actuator 61, and a Z driving tube actuator 62 connected to a front end of an XY scanning tube actuator 61, and a cantilever 64 fixed to a front end of the Z driving tube actuator 62 and having a stylus 64a at a front end thereof.

The XY scanning tube actuator 61 is provided with a tube type piezoelectric member 65, an inner side electrode 66 arranged on an inner side of the tube type piezoelectric member 65 and an outer side electrode 67 arranged on an outer side of the tube type piezoelectric member 65. The outer side electrode 67 is divided in four uniformly in a peripheral direction, and twos of the electrodes opposed to each other constitute an X scanning electrode and a Y scanning electrode.

Further, the Z driving tube actuator 62 is provided with a tube type piezoelectric member, not illustrated, similar to the XY scanning tube actuator 61, an inner side electrode, not illustrated, arranged on an inner side of the tube type piezoelectric member, and a Z driving electrode 68 arranged on an outer side of the tube type piezoelectric member. The inner side electrode of the Z driving tube actuator 62 and the inner side electrode 66 of the XY scanning tube actuator 61 are electrically connected. That is, the two inner side electrodes constitute a common electrode.

Further, the cantilever 64 is fixed to a front end of the Z driving electrode 68.

An explanation will be given of a case of moving the stylus 64a in XYZ directions by the tube type piezoelectric scanner 63 in the probe microscope 60 constituted in this way. First, in the case of moving the stylus in X direction, the two X scanning electrodes 67 opposed to each other are applied with voltages polarities of which differ from each other. Thereby, the tube type piezoelectric member 65 is bent and a total of the XY scanning tube actuator 61 is bent. The bending is transmitted to the Z driving tube actuator 62 provided at the front end of the XY scanning tube actuator 61 and therefore, as a result, the stylus 64a at the front end of the cantilever 64 can be moved in X direction.

Further, similarly, by applying the two Y scanning electrodes 67 opposed to each other with voltages polarities of which differ from each other, the stylus 64a can be moved in Y direction. In this way, by respectively applying voltages simultaneously to the X scanning electrodes 67 and the Y scanning electrodes 67, the stylus 64a can arbitrarily be scanned in XY directions.

Further, by applying voltages to the common electrode and the Z driving electrode 68, the piezoelectric member of the Z driving tube actuator 68 is elongated and contracted in Z direction. Thereby, the stylus 64a can be moved in Z direction.

In this way, by arbitrarily moving the stylus 64a respectively in XYZ directions by the tube type piezoelectric scanner 63 comprising the XY scanning tube actuator. 61 and the Z driving tube actuator 62, shape information of a surface of a sample and various physical information of the sample (for example, dielectric constant, magnetized state, permeability, viscoelasticity and friction coefficient) can be measured.

Here, measurement of angle constituting one of length measurements explained initially measures, for example, an angle of a side wall of a recessed and projected shape of an IC pattern. Particularly, with regard to an angle measuring function, linearity of Z effects a governing influence. The linearity of Z is an index of how much cross talk operation in XY directions is produced in an elongating and contracting operation in Z direction in the above-described Z driving tube actuator 62.

Particularly, the piezoelectric member of the tube type is a thin-walled ceramic circular cylinder (comprising, for example, a material of lead zirconate titanate (abbreviated as PZT)) having a thickness of about 1 mm or smaller, and owing to the thin wall, it is difficult to control accuracy of the wall thickness. Further, since the linearity of Z depends on the wall thickness, it is difficult to promote the angle measuring function by the piezoelectric member of the tube type. Further, the larger the angle to be measured, the larger the influence effected on a result of measuring the angle by an error in the linearity of Z. Particularly, in recent years, there is increased needs of measuring an angle of a side wall proximate to be vertical such as of STI (shallow trench isolation), however, as described above, the Z linearity of the tube type piezoelectric member in a current state is insufficient and an improvement thereof has been desired.

A further specific explanation will be given of the Z linearity. The Z linearity is determined by machining accuracy of coaxiality, or circularity or a nonuniformity in polarization of the tube type piezoelectric member.

Here, an explanation will be given by taking an example of a Z driving tube actuator 70 which is eccentric (a center position of an inner diameter and a center position of an outer diameter are shifted from each other) in reference to FIG. 13. Normally, the tube type piezoelectric member 71 is fabricated by boring to penetrate a center of a piezoelectric member in a circular cylinder type by machining. Therefore, a center position of a hole is shifted by a deficiency in an accuracy in machining and as shown by FIG. 13, there is brought about a state of being eccentric by producing a deviation in the thickness of the piezoelectric member 71 (a state in which a thickness d1 on one side is thinner than a thickness d2 on other side).

In this way, when voltages are applied to the eccentric piezoelectric member 71, an electric field is intensified on a thin side of the piezoelectric member 71 (d1 side) and therefore, an elongating and contracting amount is large, on the other hand, the electric field is weakened on a thick side of the piezoelectric member 71 (d2 side) and therefore, the elongating and contracting amount is reduced. As a result, as shown by FIG. 13, the piezoelectric member 71 is not elongated and contracted straight in Z direction and is bent in XY directions, that is, cross talk in XY directions is produced. That is, in accordance of displacing the probe by ΔDz, also a displacement ΔDx in X direction is produced. The error is increased particularly when a ratio of the displacements ΔDz to ΔDx (ΔDx/ΔDz) is large.

In this way, when the piezoelectric member becomes eccentric, the linearity in Z direction is deteriorated. As a result, there is a drawback that the length measurement such as of measurement of an angle cannot be carried out with high accuracy. Further, similarly, also a circularity of the piezoelectric member and the nonuniformity in polarization similarly cause to deteriorate the linearity in Z direction constituting a cause of being unable to carry out the length measurement with high accuracy.

However, since the piezoelectric member is a thin-walled ceramic circular cylinder of substantially 1 mm or smaller, there is a limit in promoting machining accuracy and it is difficult to finish the coaxiaility and the circularity with high accuracy simply by machining. Further, it is similarly difficult to control the nonuniformity in polarity with high accuracy. Further, there is also a drawback of increasing cost for fabrication and taking time and labor.

On the other hand, there is known a parallel spring type scanner excellent in linearity and giving importance on length measuring performance in which the above-described cross talk in XY directions of the tube type piezoelectric member does not pose a problem. As shown by, for example, FIG. 14, the parallel spring type scanner 80 is provided with a metal plate 81 in a shape of a frame, a movable portion 83 movable in one direction attached to the metal plate 81 by interposing a parallel spring portion 82 formed by cutting a groove by a wire cut electric discharge machine, and a stack type piezoelectric element 84 for moving the movable portion 83 in one direction relative to the metal plate 81.

According to the parallel spring type scanner 80, the movable portion 83 can be moved straight in one direction by applying voltages to the stack type piezoelectric element 84 and therefore, the parallel spring scanner 80 is excellent in linearity. Further, by surrounding the periphery of the metal plate 81 by a second metal plate, not illustrated, in a shape of a frame and providing the parallel spring portion 82 and the limited type piezoelectric element 84 between the second metal plate and the metal plate 81, the second metal plate can be moved in other direction orthogonal to the one direction. Further, the movable portion 83 can be moved straight in three directions of XYZ by constituting the movable portion 83 by further combining with the parallel spring portion 82 and the stack type piezoelectric element 84 to be able to move the second metal plate in a direction orthogonal to the one direction and the other direction.

However, the parallel spring type scanner 80 is provided with a drawback that in comparison with the above-described tube type piezoelectric scanner 63, although the parallel spring type scanner 80 is excellent in linearity, the parallel spring type scanner 80 is large-sized to need an installing space and further, cost thereof is increased and a resonance frequency is low.

In this respect, the tube type piezoelectric scanner is preferably used. Hence, there is known a probe position correcting method for correcting cross talk in XY directions by utilizing the tube type piezoelectric scanner (refer to, for example, Patent Reference 1).

The probe position correcting method is provided with a stage of measuring an amount of moving a probe in XY face in accordance with movement of the probe in Z direction from an observed image and a stage of correcting the probe position based on the moving amount. Thereby, the error caused by moving the probe in XY face in accordance with movement of the probe in Z direction can be corrected and the observed image of a sample with high accuracy can be provided.

[Patent Reference 1] JP-A-2004-4026

However, according to the method of the related art, the following problem remains to be posed.

That is, the probe position correcting method described in Patent Reference 1 is on the promise that the Z driving tube actuator is not elongated or contracted straight and correction in XY directions is simply carried out based on the provided observed image. That is, the observed image observed by the probe finally is the observed image cross talk in XY directions of which is corrected, however, the Z driving tube actuator per se is not elongated or contracted straight. Therefore, the Z driving tube actuator is inclined in XY directions or is provided with a kinetic energy in transverse direction (XY directions) and therefore, there is a concern that noise is caused and thereby accurate measurement of the sample cannot be carried out.

Further, it is necessary to output a corrected voltage in accordance with a moving amount in Z direction to XY directions and therefore, there poses a problem that a circuit is complicated.

Further, it is also difficult to deal with cross talk in XY directions by utilizing a software. That is, although movement of the piezoelectric member in XY directions can be processed to linearize by a software, with regard to movement in Z direction, modeling of motion is impossible in fact. This is because that the piezoelectric member of PZT or the like is provided with a hysteresis and therefore, there are two heights for an applied voltage, further, an amount of the hysteresis is changed by the moving amount or an offset amount. Therefore, it is difficult to deal therewith by utilizing a software. Therefore, the probe position correcting method described in Patent Reference 1 is obliged to be depended.

SUMMARY OF THE INVENTION

The invention has been carried out in consideration of such a situation and it is an object thereof to provide a surface information measuring apparatus and a surface information measuring method capable of measuring shape information or physical information of a sample with high accuracy by promoting linearity in Z direction by reducing cross talk in XY directions as less as possible.

The invention provides the following means in order to resolve the above-described problem.

According to the invention, there is provided a surface information measuring apparatus which is a surface information measuring apparatus for measuring shape information of a sample surface or physical information of a sample by making a stylus proximate to or brought into contact with the sample surface, the surface information measuring apparatus comprising a probe having the stylus at a front end thereof and arranged on an upper side of the sample, a Z actuator fixed with the probe at a front end thereof for making the probe proximate to or remote from the sample surface by being elongated or contracted in a Z direction orthogonal to the sample surface when the Z actuator is applied with a voltage, applying means for applying a voltage to the Z actuator, and controlling means for controlling to operate the applying means, wherein the Z actuator includes a piezoelectric member having a section in a cylindrical shape and formed by being elongated in the Z direction and capable of being elongated or contracted in the Z direction, and a plurality of divided electrodes provided to be respectively electrically independent from each other in a state of being divided by at least 3 or more in a peripheral direction at an inner peripheral face or an outer peripheral face of the piezoelectric member for applying the voltages to elongate or contract the piezoelectric member in the Z direction within ranges of regions brought into contact therewith, the applying means are made to be able to apply simultaneously the voltages of amounts respectively different from each other to the plurality of divided electrodes, and the controlling means controls the applying means to apply the voltages by previously determined rates of voltage applying amounts such that elongating or contracting amounts of respective contact regions of the piezoelectric member respectively brought into contact with the plurality of divided electrodes respectively become the same.

Further, according to the invention, there is provided a surface information measuring method which is a surface information measuring method of measuring shape information of a sample surface or physical information of a sample in a state of applying a voltage to elongate or contract in a Z direction a Z actuator including a piezoelectric member having a section in a cylindrical shape, formed to elongate in the Z direction orthogonal to the sample surface and capable of being elongated or contracted in the Z direction, and a plurality of divided electrodes provided to be respectively electrically independent from each other in a state of being divided at least by three or more in a peripheral direction at an inner peripheral face or an outer peripheral face of the piezoelectric member for applying the voltage to the piezoelectric member to elongate or contract in the Z direction within ranges of regions brought into contact therewith and fixed with a stylus arranged on an upper side of the sample at a front end thereof and making the stylus proximate to or brought into contact with the sample surface, the surface information measuring method comprising an applying amount setting step of setting ratios of voltage applying amounts applied to the respective divided electrodes such that elongating or contracting amounts of respective contact regions of the piezoelectric member brought into contact with the plurality of divided electrodes respectively become the same, and a voltage applying step of respectively simultaneously applying the voltages in accordance with the rates of the voltage applying amounts set by the applying amount setting step to the plurality of divided electrodes.

In the surface information measuring apparatus and the surface information measuring method according to the invention, when the voltages are applied to respectives of the plurality of divided electrodes by the applying means, the piezoelectric member can respectively be elongated or contracted in the Z direction within the ranges of the regions brought into contact with the divided electrodes.

Here, first, by the applying amount setting step, the rates of the voltage applying amounts applied to the respective divided electrodes are determined such that the elongating or contracting amounts of the respective contact regions of the piezoelectric member brought into contact with the plurality of divided electrodes respectively become the same. Thereby, even when a coaxiality or a circularity of the piezoelectric member in the cylindrical shape is not assumedly constituted accurately or when a piezoelectric sensitivity differs by locations by a cause of a nonuniformity in polarization, the piezoelectric member can be divided into a plurality of regions in accordance with a number of the divided electrodes and the elongating or contracting amounts for elongating or contracting the respective regions in the Z direction can be controlled.

Further, in the voltage applying step, by controlling the applying means to respectively simultaneously apply the voltages to the plurality of divided electrodes in accordance with the rates of the voltage applying amounts set by the controlling means, that is, by applying the voltages in accordance with the piezoelectric sensitivities of the respective contact regions, the elongating or contracting amounts of the respective contact regions directed in the Z direction can be made the same. Thereby, the linearity of the total of the Z actuator is promoted to be able to elongate or contract straight in the Z direction.

As a result, the probe fixed to the front end of the Z actuator can be made to be proximate to or remote from the sample surface straight and shape information or physical information of the sample surface can be measured by making the stylus proximate to or brought into contact with the sample surface. Particularly, cross talk in XY directions can be nullified as less as possible by promoting the linearity of the Z actuator per se and therefore, occurrence of noise caused by XY cross talk can be reduced and various information of the sample can be measured with high accuracy.

Further, at least three or more of the divided electrodes are provided and therefore, cross talk in XY directions can firmly be restrained and linearity in Z direction can be ensured. Further, by constituting to include greater number of the divided electrodes, the piezoelectric member can be divided into greater number of contact regions and a number of regions capable of controlling the elongating or contracting amounts in the Z direction can be controlled can be increased. Therefore, the linearity in the Z direction can further be promoted.

Further, the surface information measuring apparatus of the invention further comprises displacement measuring means for measuring a displacement amount and direction of a vicinity of the front end of the Z actuator in XY directions orthogonal to the Z direction by applying the same amount of the voltages to the plurality of divided electrodes, wherein the controlling means sets the voltage applying amounts based on a measurement result measured by the displacement measuring means in the surface information measuring apparatus of the invention.

Further, according to the invention, the applying amount setting step includes a displacement measuring step of measuring a displacement amount and a direction of a vicinity of the front end of the Z actuator in XY directions orthogonal to the Z direction by applying once the same amount of the voltages to the plurality of divided electrodes, and a setting step of setting the rates of the voltage applying amounts based on a result of the measurement after the displacement measuring step in the surface information measuring method of the invention.

In the surface information measuring apparatus and the surface information measuring method according to the invention, by the displacement measuring step, the respective contact regions of the piezoelectric member are elongated or contracted to be directed in the Z direction once by applying the same amount of voltages to the plurality of divided electrodes. Further, a degree of total displacement of the Z actuator in XY directions at this occasion is measured. That is, the displacement amount and direction of the vicinity of the front end of the Z actuator in XY directions are measured by the displacement measuring means. Thereby, a piezoelectric electric distribution of the piezoelectric member can be measured and a tendency or a characteristic of cross talk in XY directions can be grasped.

Further, by the setting step, the controlling portion sets the rates of the voltage applying amounts respectively applied to the plurality of divided electrodes based on the measured result of measurement. Therefore, the linearity in the Z direction of the Z actuator can further be promoted and cross talk in XY directions can further firmly be reduced.

Further, according to the invention, the controlling portion sets the rates of the voltage applying amounts based on a measurement result of respectively measuring piezoelectric sensitivities of the contact regions of the piezoelectric member brought into contact with a plurality of divided electrodes by applying the same amount of the voltage to respectives of the plurality of divided electrodes in the surface information measuring apparatus of the invention.

Further, according to the invention, the applying amount setting step includes a sensitivity measuring step of respectively measuring piezoelectric sensitivities of the piezoelectric member brought into contact with the plurality of divided electrodes by once applying the same amount of the voltages to respectives of the plurality of directed electrodes, and a setting step of setting the rates of the voltage applying amounts based on a result of the measurement after the sensitivity measuring step in the surface information measuring method of the invention.

In the surface information measuring apparatus and the surface information measuring method according to the invention, by the sensitivity measuring step, the respective contact regions of the piezoelectric member are elongated or contracted to direct in the Z direction once by applying the same amount of the voltages to respectives of the plurality of divided electrodes. Further, the piezoelectric sensitivities of the respective contact regions at this occasion are respectively measured.

Further, by the setting step, the controlling portion sets the rates of the voltage applying amounts respectively applied to the plurality of divided electrodes based on a measured result of measurement. Therefore, the elongating or contracting amounts of the respective contact regions become the same, as a result, the linearity of the total of the Z actuator directed in the Z direction is further promoted and cross talk in XY directions can firmly be reduced.

Further, according to the surface information measuring apparatus of the invention described any of the above, the plurality of divided electrodes are arranged uniformly in the peripheral direction of the piezoelectric member.

In the surface information measuring apparatus according to the invention, the divided electrodes are uniformly arranged in the peripheral direction of the piezoelectric member and therefore, also the contact regions of the piezoelectric member brought into contact with the divided electrodes can similarly be arranged uniformly in the peripheral direction by the same length. Thereby, the elongating or contracting amounts of the respective contact regions directed in the Z direction are easy to adjust to move straight in the Z direction.

Further, according to the invention, there is provided a surface information measuring apparatus which is a surface information measuring apparatus for measuring shape information of a sample surface or physical information of a sample by making a stylus proximate to or brought into contact with the sample surface, the surface information measuring apparatus comprising a probe having the stylus at a front end thereof and arranged on an upper side of the sample, a stack type Z actuator fixed with the probe at a front end thereof for making the probe proximate to or remote from the sample surface by being elongated or contracted in a Z direction orthogonal to the sample surface when the stack type Z actuator is applied with a voltage, applying means for applying the voltage to the stack type Z actuator, and controlling means for controlling to operate the applying means, wherein the stack type Z actuator includes a plurality of layers of piezoelectric members in a sheet-like shape arranged along faces in parallel with the sample surface and capable of being elongated and contracted in the Z direction and piezoelectric elements including pluralities of pair electrodes dividedly arranged to be respectively electrically independent from each other at at least three or more of sections of both faces of the piezoelectric member in a state of laminating the respective pair electrodes, wherein the applying means is made to be able to apply simultaneously the voltages of amounts different from each other to the plurality of pair electrodes, and the controlling means controls the applying means to apply the voltages by previously determined rates of voltage applying amounts such that elongating or contracting amounts of the piezoelectric member brought into contact with the plurality of pair electrodes respectively become the same.

Further, according to the invention, there is provided a surface information measuring method which is a surface information measuring method of measuring shape information of a sample surface or physical information of a sample in a state of applying a voltage to elongate or contract in a Z direction a stack type Z actuator including a plurality of layers of sheet-like piezoelectric members in the Z direction arranged along faces in parallel with the sample surface and capable of being elongated or contracted in the Z direction orthogonal to the sample surface, and piezoelectric elements including a plurality of pair electrodes dividedly arranged to be respectively electrically independent from each other at least at three or more of sections of both faces of the piezoelectric member in a state of laminating the respective pair electrodes and making a stylus arranged on an upper side of the sample proximate to or brought into contact with the sample surface, the surface information measuring method comprising an applying amount setting step of applying rates of voltage applying amounts for applying to the respective pair electrodes such that elongating or contracting amounts of the piezoelectric member brought into contact with the plurality of pair electrodes respectively become the same, and a voltage applying step of respectively simultaneously applying the voltages in accordance with the rates of the voltage applying amounts set by the applying amount setting step to the plurality of pair electrodes.

In the surface information measuring apparatus and the surface information measuring method according to the invention, when the voltages are applied respectively to the pair electrodes divided electrically independently at three or more of the regions by the applying means, the piezoelectric members of the respective layers interposed between the pair electrodes respectively are elongated or contracted in the Z direction.

Here, first, by the applying amount setting step, the rates of the voltage applying amounts applied to the respective pair electrodes are determined such that the elongating or contracting amounts of the piezoelectric member brought into contact with each other in the state of being interposed by the plurality of pair electrodes respectively become the same. Thereby, even when the piezoelectric sensitivity of the piezoelectric member assumedly differs depending on the locations, the piezoelectric member can be divided into a plurality of regions in accordance with the number of the pair electrodes and the elongating or contracting amounts of elongating or contracting the respective regions in the Z direction can be controlled.

Further, in the voltage applying step, by controlling the applying means to apply respectively simultaneously the voltages in accordance with the rates of the voltage applying amounts set by the controlling means to the plurality of pair electrodes, that is, by applying the voltages in accordance with the piezoelectric sensitivities of the respective regions, the elongating or contracting amounts of the respective regions directed in the Z direction can be made to be the same. Thereby, the linearity of the total of the stack type Z actuator can be promoted thereby enable to elongate or contract straight in the Z direction.

As a result, a probe fixed to the front end of the stack type Z actuator can be made proximate to or remote from the sample surface straight and shape information or physical information of the sample surface can be measured by making the stylus proximate to or brought into contact with the sample surface. Particularly, cross talk in XY directions can be nullified as less as possible by promoting the linearity of the stack type Z actuator per se and therefore, occurrence of noise caused by XY cross talk can be reduced and various information of the sample can be measured with high accuracy.

Further, at least three or more of the pair electrodes are provided and therefore, cross talk in XY directions can firmly be restrained and the linearity in the Z direction can be ensured. Further, by constituting to provide more pair electrodes, the piezoelectric member can be divided into more regions and a number of regions capable of controlling the elongating or contracting amounts in the Z direction can be increased. Therefore, the linearity in the Z direction can further be promoted.

Further, according to the invention, there is provided a surface information measuring apparatus which is a surface information measuring apparatus for measuring shape information of a sample surface or physical information of a sample by making a stylus proximate to or brought into contact with the sample surface, the surface information measuring apparatus comprising a probe having the stylus at a front end thereof and arranged on an upper side of the sample, amounting base in a flat plate shape mounted with the sample at an upper face thereof and arranged along a face in parallel with the sample surface, at least three or more of a plurality of Z actuators for supporting the mounting base from a lower face side thereof and making the sample surface proximate to or remote from the probe by elongation or contraction in a Z direction orthogonal to the sample surface when the Z actuators are applied with voltages, applying means capable of simultaneously applying different amounts of the voltages to respectives of the plurality of Z actuators, and controlling means for controlling the applying means to apply the voltages by previously determined rates of voltage applying amounts such that elongating or contracting amounts of the plurality of Z actuators respectively become the same when the sample surface is made proximate to or remote from the probe.

Further, according to the invention, there is provided a surface information measuring method which is a surface information measuring method of measuring shape information of a sample surface or physical information of a sample in a state of applying a voltage to elongate or contract in a Z direction at least three or more of a plurality of Z actuators mounted with a sample arranged on a lower side of a probe having a stylus at a front end thereof at an upper face thereof and supporting a mounting base in a flat plate shape arranged along a face in parallel with the sample surface from a lower face side in a state a stylus is made proximate to or brought into contact with the sample surface, the surface information measuring method comprising an applying amount setting step of setting rates of voltage applying amounts applied to the plurality of Z actuators such that elongating or contracting amounts of the plurality of Z actuators respectively become the same, and a voltage applying step of respectively simultaneously applying the voltages in accordance with the rates of the voltage applying amounts set by the applying amount setting step to the plurality of Z actuators.

In the surface information measuring apparatus and the surface information measuring method according to the invention, when the voltages are respectively applied to the three Z actuators by the applying means, the Z actuators are elongated or contracted in the Z direction and the mounting base mounted with the sample is moved in the Z direction.

Here, first, by the applying amount setting step, the rates of the voltage applying amounts applied to the respective Z actuators are determined such that the elongating or contracting amounts of the plurality of Z actuators respectively become the same.

Further, in the voltage applying step, by controlling the applying means to apply respectively simultaneously the voltages in accordance with the rates of the voltage applying amounts set by the controlling means to the respective Z actuators, that is, by applying the voltages in accordance with the piezoelectric sensitivities of the respective Z actuators, the elongating or contracting amounts of the respective Z actuators directed in the Z direction can be made to be the same. Thereby, the linearity of the total of the plurality of Z actuators is promoted to be able to elongate or contract straight in the Z direction.

As a result, the mounting base and the sample supported by the plurality of Z actuators can be moved straight to direct in the Z direction to be proximate to or remote from the probe and surface information or physical information of the sample surface can be measured by making the stylus proximate to or brought into contact with the sample surface. Particularly, cross talk in XY directions can be nullified as less as possible by promoting the linearity of the total of the plurality of Z actuators and therefore, occurrence of noise caused by XY cross talk can be reduced and various information of the sample can be measured with high accuracy.

Further, according to the invention, the surface information measuring apparatus described in any one of the invention further includes moving means for moving the probe and the sample relative to each other to direct to the direction in parallel with the sample surface.

Further, according to the invention, the surface information measuring method described in any one of the invention further includes a scanning step of moving the probe and the sample relative to each other to be directed in a direction in parallel with the sample surface.

In the surface information measuring apparatus and the surface information measuring method according to the invention, there is provided the scanning step of scanning the sample surface by moving the prove and the sample relative to each other to direct in the direction in parallel with the sample surface by the moving means and therefore, a distribution of changing physical information in a certain predetermined region can be measured and further diversified measurement of the sample can be carried out.

According to the surface information measuring apparatus and the surface information measuring method according to the invention, even when the coaxiality or the circularity of the piezoelectric member is not constituted accurately or the piezoelectric sensitivity of the piezoelectric member differs depending on the locations by the cause of the nonuniformity in polarization, the elongating or contracting amounts directed in the Z direction can be made to be the same by applying the voltages in accordance with the respective piezoelectric sensitivities to the respective contact regions of the piezoelectric member brought into contact with the plurality of divided electrodes and therefore, cross talk in XY directions of the total of the Z actuator can be nullified as less as possible and the linearity of the Z actuator can be promoted. Therefore, occurrence of noise caused by cross talk in XY directions can be reduced and shape information or physical information of the sample can be measured with high accuracy.

DETAILED DESCRIPTION OF PREFERRED EMBODIMENTS

An explanation will be given of a first embodiment of a surface information measuring apparatus and a surface information measuring method according to the invention in reference to FIG. 1 through FIG. 7 as follows.

Figure 1:
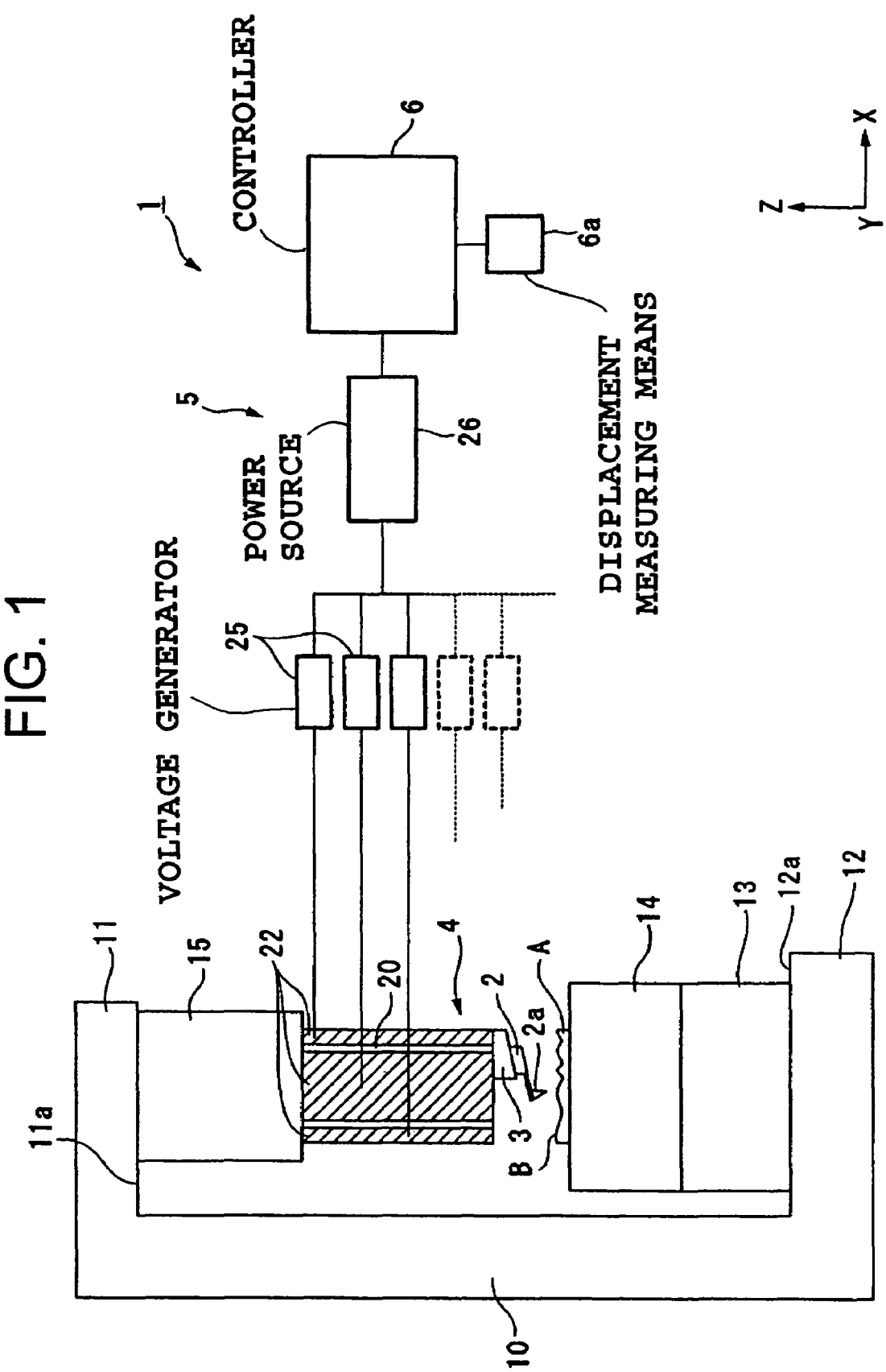
FIG. 1 is a total constitution diagram showing a first embodiment of a scanning probe microscope (surface information measuring apparatus) according to the invention.

As shown by FIG. 1, a scanning probe microscope (surface information measuring apparatus) 1 of the embodiment measures shape information of a sample surface B or physical information (for example, dielectric constant, magnetized state, permeability, viscoelasticity and friction coefficient) of a sample A by bringing a stylus 2a proximate or brought into contact with the sample surface B and is provided with a cantilever 2 (probe) having the stylus 2a at a front end thereof and arranged above the sample A, a Z element (Z actuator) 4 fixed with the cantilever 2 via an attaching member 3 for making the cantilever 2 proximate to or remote from the sample surface B by a small distance by being elongated or contracted in Z direction orthogonal to the sample surface B when applied with a voltage, applying means 5 for applying the voltage to the Z element 4, and a controlling apparatus (controlling means) 6 for controlling to operate the applying means 5.

Further, the scanning probe microscope 1 of the embodiment is provided with a cabinet 10 for fixing the sample A and the Z element 4. The cabinet 10 is provided with an upper base 11 and a lower base 12 opposed to each other and having attaching faces 11a, 12a in XY directions in parallel with the sample surface B. Further, an XY moving stage 13 for roughly moving the sample A in XY directions is fixed on the attaching face 12a of the lower base 12, and a Z roughly moving mechanism 14 for roughly moving the sample A in Z direction on the XY moving stage 13. Further, the sample A is mounted to be fixed to an upper face of the Z roughly moving mechanism 14. The XY moving stage 13 and the Z roughly moving mechanism 14 are controlled to operate by the controlling apparatus 6.

Further, the attaching face 11a of the upper base 11 is fixed with an XY element (moving means) 15 a front end of which is moved in XY directions by a small amount to hang down when applied with the voltage by the applying means 5. Further, the front end of the XY element 15 is fixed with the Z element 4. That is, the XY element 15 can move the cantilever 2 in XY directions by a small amount via the Z element 4. That is, the XY element 15 is provided with a function as moving means for moving the cantilever 2 and the sample A relative to each other by a small amount in XY directions in parallel with the sample surface B.

Figure 2:
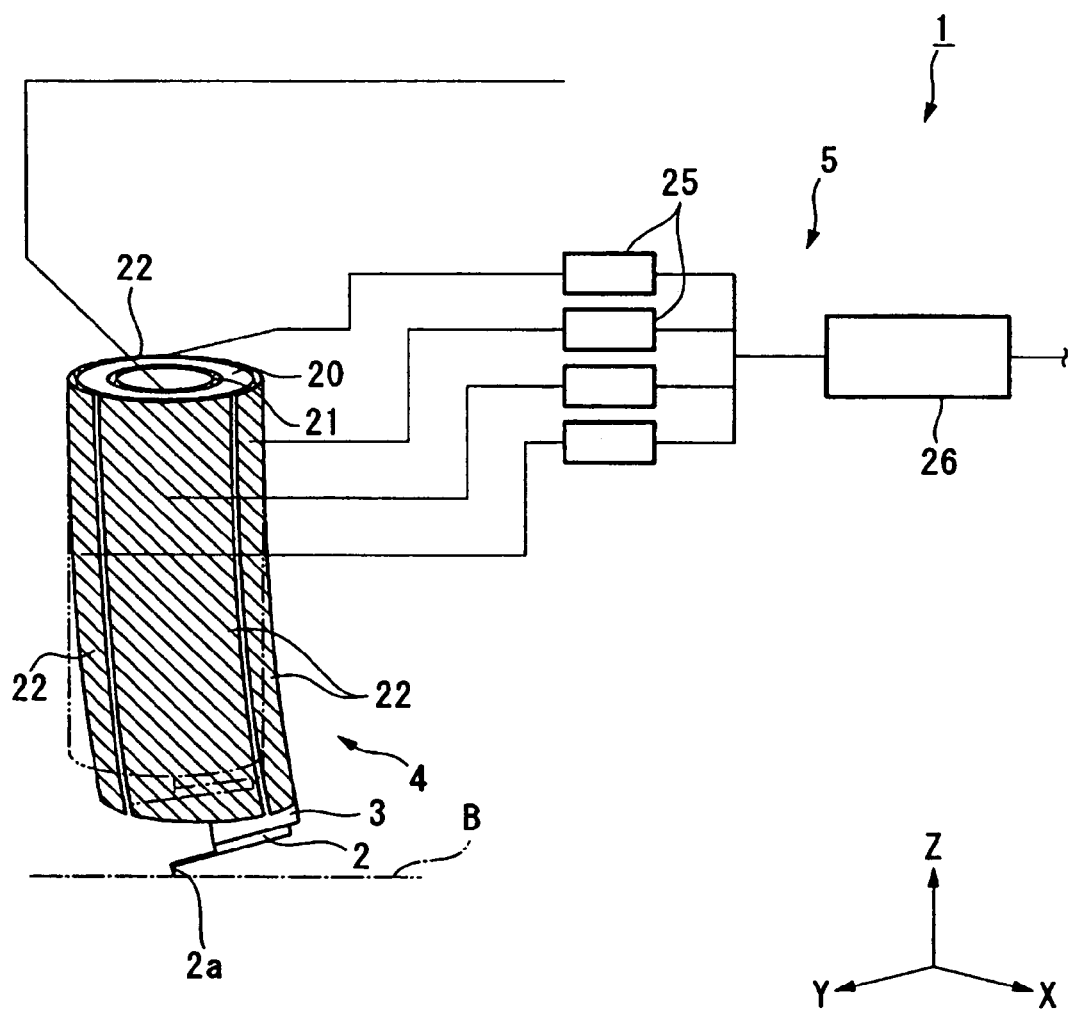
FIG. 2 is a constitution view showing a Z element and applying means of the scanning probe microscope shown in FIG. 1.
Figure 3:
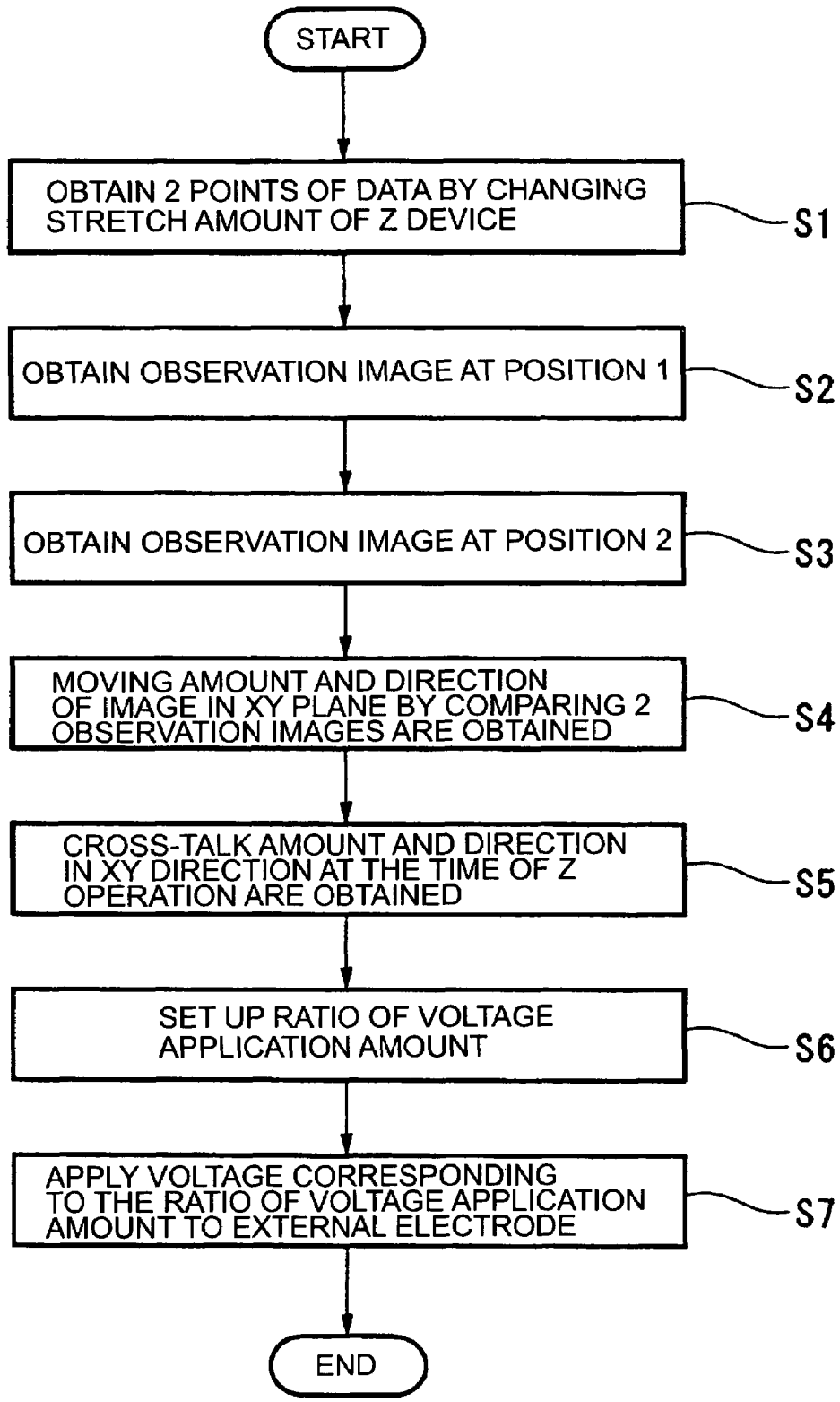
FIG. 3 is a flowchart showing a step of a surface information measuring method according to the invention for measuring shape information of a sample surface or physical information of a sample by the scanning probe microscope shown in FIG. 1.

As shown by FIG. 2, the Z element 4 is provided with a piezoelectric member 20 having a section in a cylindrical shape and formed by being extended in Z direction and capable of being elongated and contracted in Z direction, a ground electrode 21 provided along an inner peripheral face of the piezoelectric member 20, and a plurality of external electrodes (divided electrodes) 22 provided to be respectively electrically independent from each other in a state of being divided by at least three or more in a peripheral direction at an outer peripheral face of the piezoelectric member 20 for elongating and contracting the piezoelectric member 20 in Z direction by applying voltages within ranges of regions brought into contact therewith.

Further, although according to the embodiment, an explanation will be given by taking an example of the external electrodes 20 provided at the outer peripheral face of the piezoelectric member 20 as the plurality of divided electrodes, the embodiment is not limited thereto but divided electrodes maybe constituted by dividing the ground electrode 21 provided at an inner peripheral face of the piezoelectric member 20 by a plural number.

The piezoelectric member 20 comprises a piezoelectric material of PZT (lead zirconate titanate) and is formed in a cylindrical shape by boring to penetrated a center thereof from a state of a solid circular cylinder by machining. Further, the ground electrode 21 is, for example, metallized over a total of the inner peripheral face of the piezoelectric member 20.

The plurality of external electrodes 22 are formed by four according to the embodiment and are, for example, metallized to provide the same length by being arranged uniformly in the peripheral direction of the piezoelectric member 20.

Here, the XY element 15 is provided with a piezoelectric member, a ground electrode and four of external electrodes, not illustrated, similar to the Z element 4. Further, by applying voltages having different polarities to two external electrodes opposed to each other by the applying means 5, one of the piezoelectric member brought into contact with the respective external electrodes is elongated in Z direction and other thereof is contracted in Z direction. Thereby, the XY element 15 is totally bent and a front end thereof is moved in XY directions by a small amount.

The applying means 5 is provided with individual voltage generators 25 electrically connected respectively to four external electrodes 22 and a Z power source 26 electrically connected to the respective individual voltage generators 25 and four external electrodes 22 can simultaneously be applied with voltages respectively having different amounts.

Further, the applying means 5 can apply voltages by predetermined polarities and voltage values also to the external electrodes 22 of the XY element 15 similar to the Z element 4.

The controlling apparatus 6 controls the applying means 5 to apply voltages by previously determined rates of voltage applying amounts such that elongating and contracting amounts of the respective contact regions of the piezoelectric member 20 respectively brought into contact with four external electrodes 22 respectively become the same.

That is, the controlling apparatus 6 is provided with a displacement measuring portion (displacement measuring means) 6a for measuring a displacement amount and direction of a vicinity of a front end of the Z element 4 in the XY directions orthogonal to the Z direction by applying the same amount of voltages to four external electrodes 22 and sets the rates of the voltage applying amounts based on a result of measurement by the displacement measuring portion 6a. A detailed explanation will later be given thereof.

An explanation will be given as follows of a surface information measuring method for measuring shape information and physical information of the sample A by the scanning probe microscope 1 constituted in this way.

The surface information measuring method of the embodiment is provided with an applied amount setting step of setting rates of voltage applying amounts applied to the respective external electrodes 22 such that the elongating and contracting amounts of the respective contact regions of the piezoelectric member 20 brought into contact with four external electrodes 22 respectively become the same, a voltage applying step of respectively simultaneously applying the voltages in accordance with the rates of the voltage applying amounts set by the applying amount setting step to four external electrodes 22, and a moving step of moving the cantilever 2 and the sample A relative to each other in XY directions in parallel with the sample surface B.

Further, according to the embodiment, the applying amount setting step is provided with a displacement measuring step of measuring a displacement amount and direction of a vicinity of a front end of the Z element 4 in XY directions by once applying the same amount of the voltages to four external electrodes. 22, and a setting step of setting the rates of the voltage applying amounts based on a result of measurement after the displacement measuring step. A detailed explanation will be given as follows of the respective steps in reference to a flowchart shown in FIG. 3.

First, by the XY moving stage 13 and the Z roughly moving mechanism 14, the sample A is roughly moved in XYZ directions such that the stylus 2a reaches a region for measuring the sample A and thereafter, by the applying amount setting step, the rates of the voltage applying amounts applied to four external electrodes 22 are set. That is, first, there is carried out the displacement measuring step of measuring the displacement amount and direction of the vicinity of the front end portion of the Z element 4 in XY directions by the displacement measuring portion 6a.

Specifically, by changing an amount of elongating the Z element 4 and acquiring two points of data by the displacement measuring portion 6a at respective positions (S1), the displacement amount and the direction are measured. That is, as shown by FIG. 4, at two positions of a position (position 1) of displacing the Z element 4 by applying the same amount of voltages to four external electrodes 22 and a position (position 2) of displacing the Z element 4 by applying the same amounts of voltage different from the voltages applied to position 1 to the external electrodes 22, the displacement amount and the direction in XY directions are measured by acquiring observed images of the sample A by utilizing the cantilever 2 and comparing the two observed images.

Figure 4:
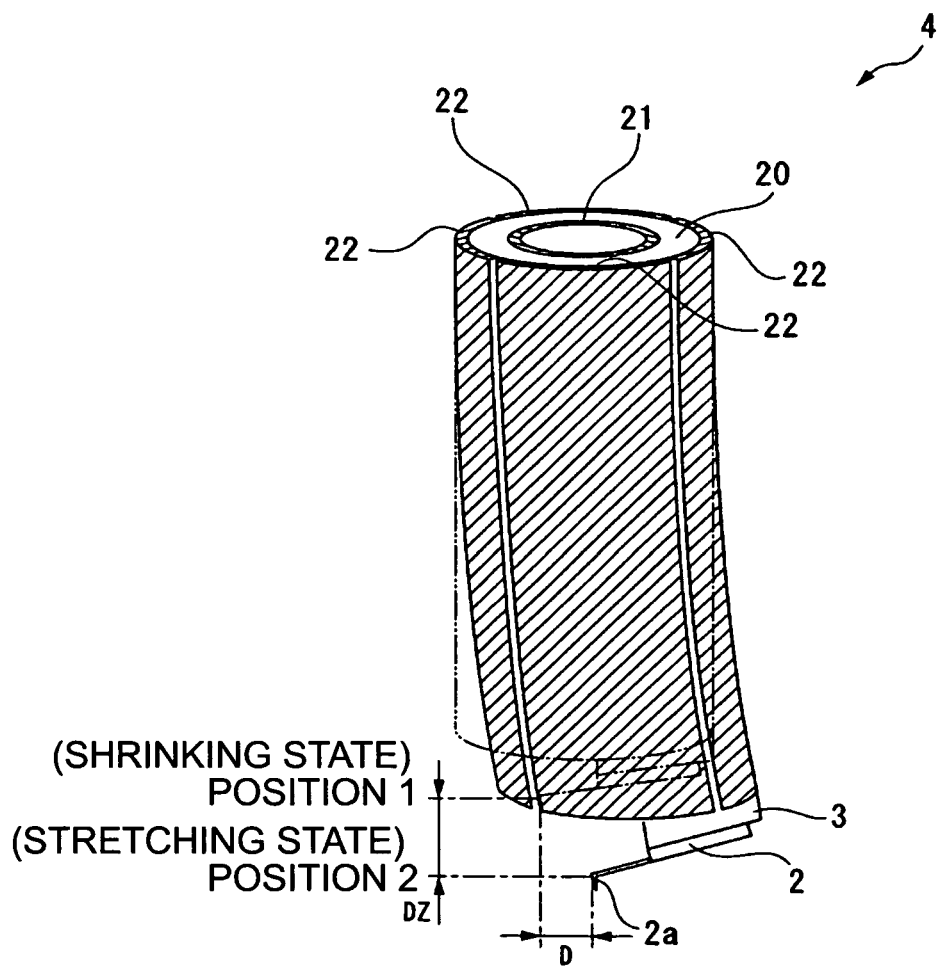
FIG. 4 is a view showing a state of acquiring an observed image at two points (position 1 and position 2) by elongating and contracting the Z element at an applied amount setting step.
Figure 5:
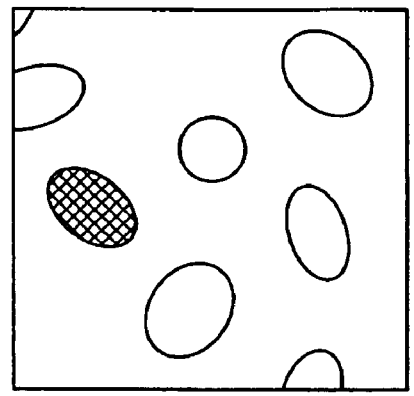
FIG. 5 is a view showing an example of the observed image acquired at position 1 in FIG. 4.
Figure 6:
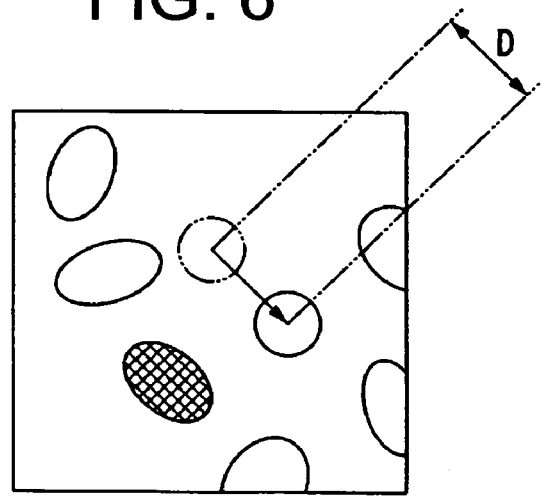
FIG. 6 is a view showing an example of the observed image acquired at position 2 in FIG. 4.

First, as shown by FIG. 4, in a state (position 1) of contracting the Z element 4 by applying the voltage to four external electrodes 22, as shown by FIG. 5, the observed image of the sample A is acquired (S2). Next, by applying the same amount of voltages different from those at position 1 to four external electrodes 22 by the individual voltage generators 25, four contact regions of the piezoelectric member 20 are elongated in Z direction. At this occasion, since the piezoelectric sensitivity differs depending on the locations by causes of the shift in the coaxiality (eccentricity), the shift in the circularity and nonuniformity in polarization, the elongating amount differs in the piezoelectric member 20. As a result, the Z element 4 is totally displaced in XY directions, that is, cross talk in XY directions is produced. Thereby, at the state of elongating the Z element (positioning 2), as shown by FIG. 4, when positions of the stylus 2a are compared, the Z element 4 is displaced in XY directions by a distance D and elongated in Z direction by a distance Dz. Further, under the state, as shown by FIG. 6, the observed image of the sample A is acquired (S3).

Furthers although it is preferable that position 1 and position 2 are proximate to both ends of a movable range of the Z element 4 (that is, two points under a contracted state and an elongated state as in the embodiment) in order to promote measurement accuracy, the embodiment is not limited to the positions.

Further, the displacement measuring portion 6a compares the two acquired observed images to measure a degree of displacement of an object the image of which is taken in the respective observed images, that is, the displacement amount and the direction of the displacement of the object are measured (S4). The degree of displacement of the object coincides with the displacement amount D and the direction of the position of the stylus 2a and therefore, by comparing the two observed images, the displacement amount (cross talk amount) and the direction of the stylus 2a in XY directions can be measured (S5).

Further, since the stylus 2a is fixed to the front end of the Z element 4, by measuring the position of the stylus 2a, the displacement amount and direction of the vicinity of the front end of the Z element 4 are measured.

After the displacement measuring step, the controlling apparatus 6 executes the setting step of setting the rates of the voltage applying amounts based on a result of measurement measured by the displacement measuring portion 6a (S6).

That is, by the cross talk amount D and the direction in XY directions relative to the distance Dz of elongating the Z element 4 in Z direction, a tendency and a characteristic of cross talk in XY directions can be grasped and a piezoelectric distribution of the piezoelectric member 20 can be measured. Further, the controlling portion sets the rates of the voltage applying amounts respectively applied to four external electrodes 22 based on the piezoelectric distribution.

After finishing the above-described voltage applying amount setting step, the controlling apparatus 6 executes a voltage applying step (S7) for controlling the applying means 5 to respectively simultaneously apply the voltages in accordance with the set rates of the voltage applying amounts to four external electrodes 22 (S7).

According to the embodiment, the piezoelectric member 20 is divided into the four regions in accordance with a number of the external electrodes 22 and the elongating and contracting amounts of elongating and contracting the respective regions in Z direction can respectively be controlled. Therefore, by applying the voltages in accordance with the piezoelectric sensitivities of the respective contact regions by the voltage applying step, the elongating and contracting amounts of the respective contact regions directed in Z direction can be made to be the same. Thereby, the linearity of the total of the Z element 4 can be promoted and the Z element 4 can be elongated and contracted straight in Z direction.

As a result, the cantilever 2 fixed to the front end of the Z element 2 can be made to be proximate to and remote from the sample surface B straight and shape information or physical information of the sample surface B can be measured by making the stylus 2a proximate to or brought into contact with the sample surface B. Particularly, cross talk in XY direction can be nullified as less as possible by promoting the linearity of the Z element 4 per se and therefore, occurrence of noise caused by XY cross talk can be reduced and various information of the sample A can be measured with high accuracy.

Further, in measuring the sample A, a scanning step can be executed by the XY element 15 and therefore, by scanning the sample surface B in XY directions, a distribution of a change of physical information at a predetermined region (range) can be measured and further diversified measurement of the sample A can be executed.

As described above, according to the scanning probe microscope 1 and the surface information measuring method of the embodiment, even when the coaxiality or the circularity of the piezoelectric element 20 is not accurately produced or the piezoelectric sensitivity of the piezoelectric member 20 differ depending on the locations caused by a nonuniformity in polarity, by applying the voltages in accordance with the piezoelectric sensitivities of the respective contact regions of the piezoelectric member 20, the elongating and contracting amounts of the respective contact regions directed in Z direction can be made to be the same and therefore, cross talk in XY directions of the Z element 4 can be nullified as less as possible and the linearity of the Z element 4 can be promoted. Therefore, occurrence of noise caused by cross talk in XY directions can be reduced and the sample A can be measured with high accuracy.

Figure 7A:
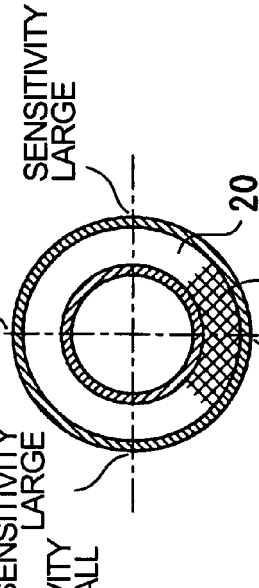
FIGS. 7A, 7B, 7C, 7D, 7E and 7F are views showing rates of voltage applied amounts applied to respective external electrodes by the scanning probe microscope shown in FIG. 1 when the piezoelectric member is eccentric, shifted from a true circle or nonuniform in polarization.
Figure 7B:
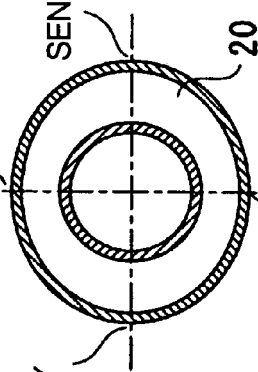
Figure 7C:
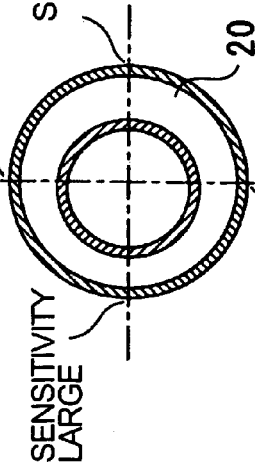
Figure 7D:
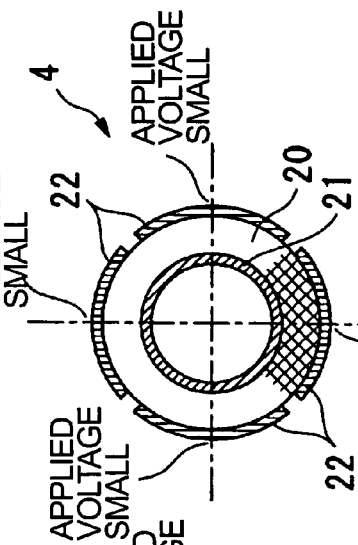
Figure 7E:
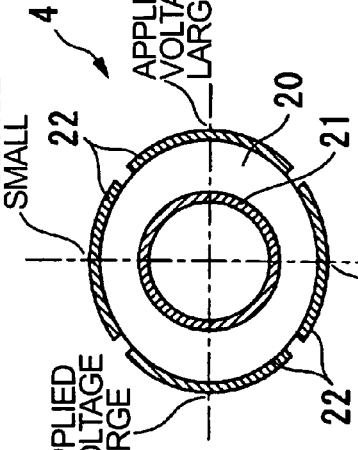
Figure 7F:
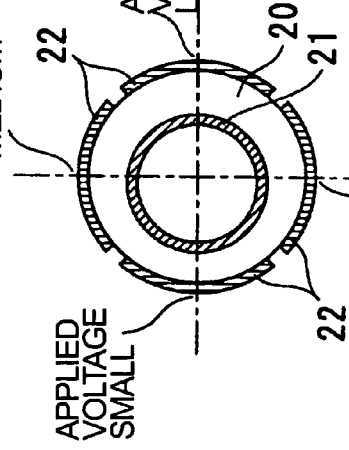

When a further specific explanation is given in reference to FIGS. 7A, 7B, 7C, 7D, 7E and 7F, even when the piezoelectric member 20 becomes eccentric (shift between a center position of an inner diameter and a center position of an outer diameter) as shown by FIG. 7A, even when a shift from a true circle is produced in the piezoelectric member 20 as shown by FIG. 7B, or even when a nonuniformity in polarization of the piezoelectric member 20 is produced as shown in FIG. 7C, according to the embodiment, as shown from FIG. 7D through FIG. 7F, in accordance with the piezoelectric sensitivities of the respective contact regions of the piezoelectric member 20 brought into contact with four external electrodes 22, the rates of the voltage applying amounts applied to the external electrodes 22 are set and cross talk in XY directions of the Z element 4 can be nullified as less as possible.

Further, by arranging four external electrodes 22 uniformly in the peripheral direction of the piezoelectric member 20, also the contact regions of the piezoelectric member 20 are arranged uniformly in the peripheral direction by the same length and therefore, the elongating and contracting amounts of the respective contact regions are easy to adjust.

Next, a second embodiment of a surface information measuring apparatus and a surface information measuring method according to the invention will be explained in reference to FIG. 8 and FIG. 9. Further, constitutions of the second embodiment the same as those of the first embodiment are attached with the same notations and an explanation thereof will be omitted.

A point of the second embodiment which differs from the first embodiment resides in that although according to the fourth embodiment, by simultaneously applying the same amount of voltages to four external electrodes 22 and measuring a cross talk amount and direction in XY directions for the total of the Z element 4, the piezoelectric sensitivities of the Z element 4 are calculated and the rates of the voltage applying amounts are set from the result, according to the second embodiment, piezoelectric sensitivities of respective contact regions of the piezoelectric member 20 brought into contact with four external electrodes 22 are respectively measured and the rates of the voltage applying amounts are set from the result.

That is, according to the scanning probe microscope 30 of the embodiment, a result of measurement is provided from sensitivity measuring means 31 for respectively measuring piezoelectric sensitivities of the piezoelectric member 20 brought into contact with four external electrodes 22 by respectively applying the same amount of voltages to four external electrodes 22, and the controlling apparatus 6 sets the rates of the voltage applying amounts based on the result of measurement.

Figure 8:
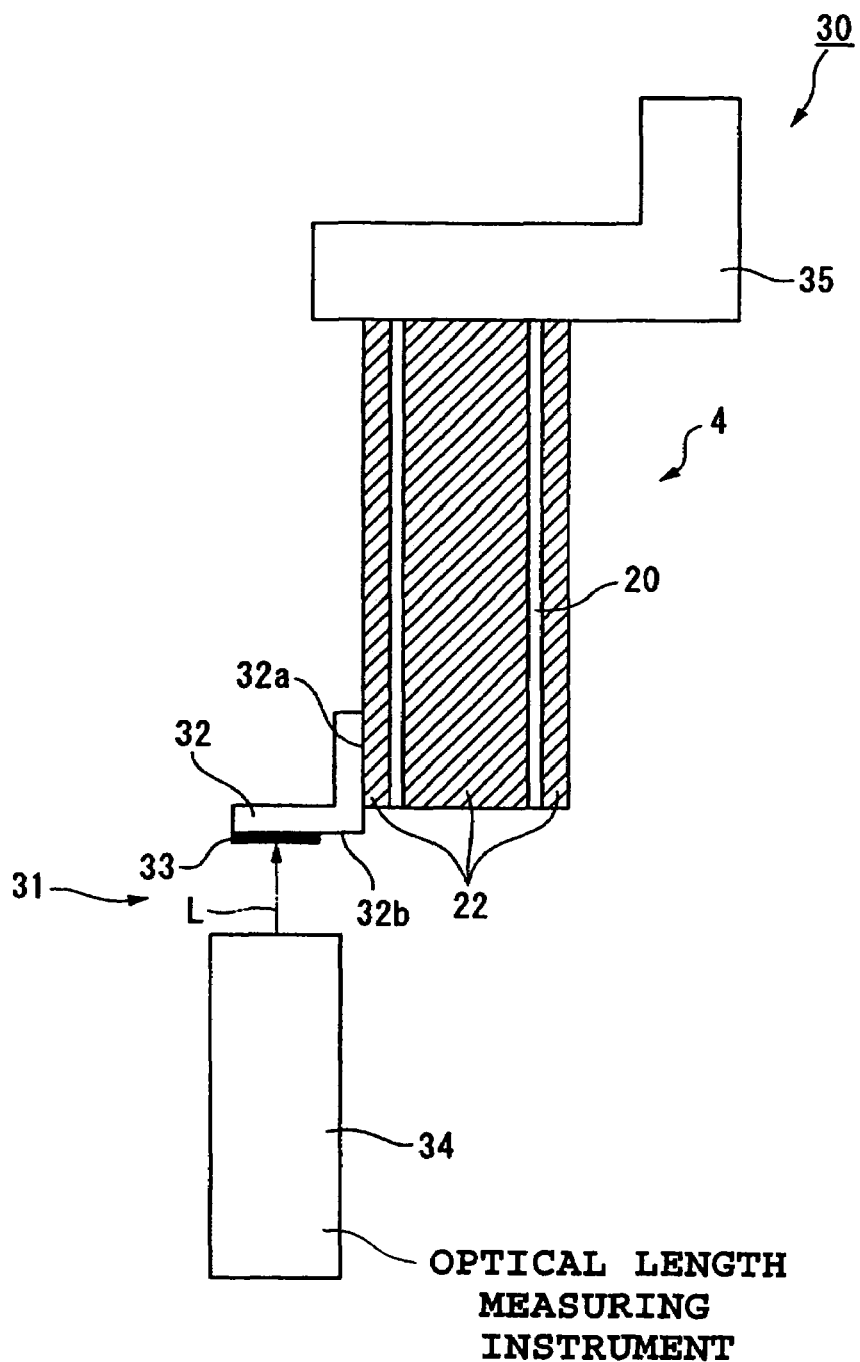
FIG. 8 is a view showing a second embodiment of a scanning probe microscope (surface information measuring apparatus) according to the invention and is a view showing a state of attaching a mirror to the Z element for respectively measuring piezoelectric sensitivities of respective contact regions of the piezoelectric member.
Figure 9:
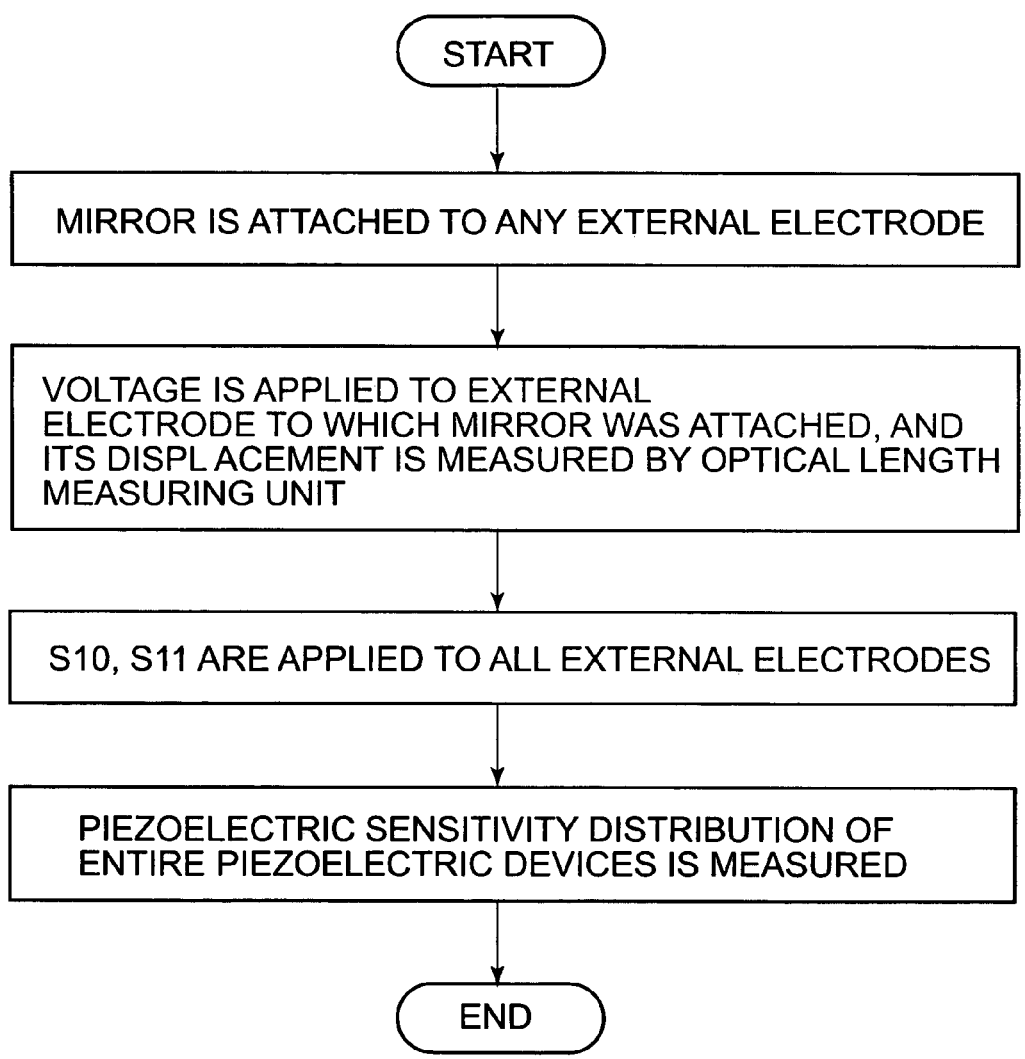
FIG. 9 is a flowchart showing a step in measuring a piezoelectric sensitivity distribution of a total of the Z element by the scanning probe microscope shown in FIG. 8.

As shown by FIG. 8, the sensitivity measuring means 31 is provided with an attachment metal piece 32 in a shape of an L angle formed by being bent by 90 degrees such that one face 32a and other face 32b thereof are orthogonal to each other and capable of attaching the one face 32a on the outer peripheral face of each of the external electrodes 22, a mirror 33 pasted on the other face 32b of the attachment metal piece 32 and an optical length measuring instrument 34 for measuring displacement of the mirror 33 by irradiating light L to a surface of the mirror 33 and receiving reflected light L.

An explanation will be given of a case of executing an applying amount setting step by the scanning probe microscope 30 constituted in this way.

The applying amount setting step of the embodiment is provided with a sensitivity measuring step of respectively measuring piezoelectric sensitivities of the piezoelectric member 20 brought into contact with four external electrodes 22 by applying once the same amount of voltages to respectives of the plurality of external electrodes 22 and a setting step of setting the rates of the voltage applying amounts based on a result of the measurement after the sensitivity measuring step.

Further, according to the embodiment, in executing the applying amount setting step, as shown by FIG. 8, the step is executed in a state of attaching only the Z element 4 to a Z element attaching metal piece 35. However, the step may be executed in a state of being attached to the XY element 15.

First, the one face 32a of the attachment metal piece 32 pasted with the mirror 33 at the other face 32b is attached to the outer peripheral face of any external electrode 22 of four external electrodes 22 (S10). Further, light L is irradiated to the surface of the mirror 33 by the optical length measuring instrument 34.

Under the state, the voltage is applied only to the external electrode 22 attached with the attachment metal piece 32 and a contact region of the piezoelectric element 20 brought into contact with the external electrode 22 is elongated and contracted in Z direction. Thereby, a distance in Z direction between the mirror 33 and the optical measuring instrument 34 is changed. Further, the change is measured by the optical length measuring instrument 34 (S11). Further, there is, for example, a triangulation system or an interference system for the optical length measuring instrument 34.

Further, the above-described measurement is executed for all of contact regions of the piezoelectric member 20 (S12). After the measurement, by comparing displacements of the respective contact regions, a piezoelectric sensitivity distribution of a total of the piezoelectric member 20 can be measured (S13). Thereafter, the controlling apparatus 6 sets the rates of the voltage applying amounts in accordance with the measured respective piezoelectric sensitivities.

Particularly, according to the scanning probe microscope 30 of the embodiment, the piezoelectric sensitivities of the respective contact regions of the piezoelectric member 20 are respectively separately measured and therefore, it is easy to set the rates of the voltage applying amounts such that the respective elongating and contracting amounts become the same.

Further, when the ground electrode 21 provided at the inner peripheral face of the piezoelectric member 20 is adopted as a plurality of divided electrodes, the mirrors 33 may be attached to the ground electrode 21 and the respective piezoelectric sensitivities may be measured.

Next, an explanation will be given of a third embodiment of a surface information measuring apparatus and a surface information measuring method according to the invention in reference to FIG. 10. Further, constitutions in the third embodiment similar to those of the first embodiment are attached with the same notations and an explanation thereof will be omitted.

A point of the third embodiment which differs from the first embodiment resides in that although according to the first embodiment, the cantilever 2 is moved by a small amount in Z direction by the Z element 4 having the piezoelectric member 20 in a cylindrical shape, according to the third embodiment, the cantilever 2 is moved by a small amount in Z direction by a stack type Z actuator 40 having a piezoelectric member 41 in a sheet-like shape.

Figure 10:
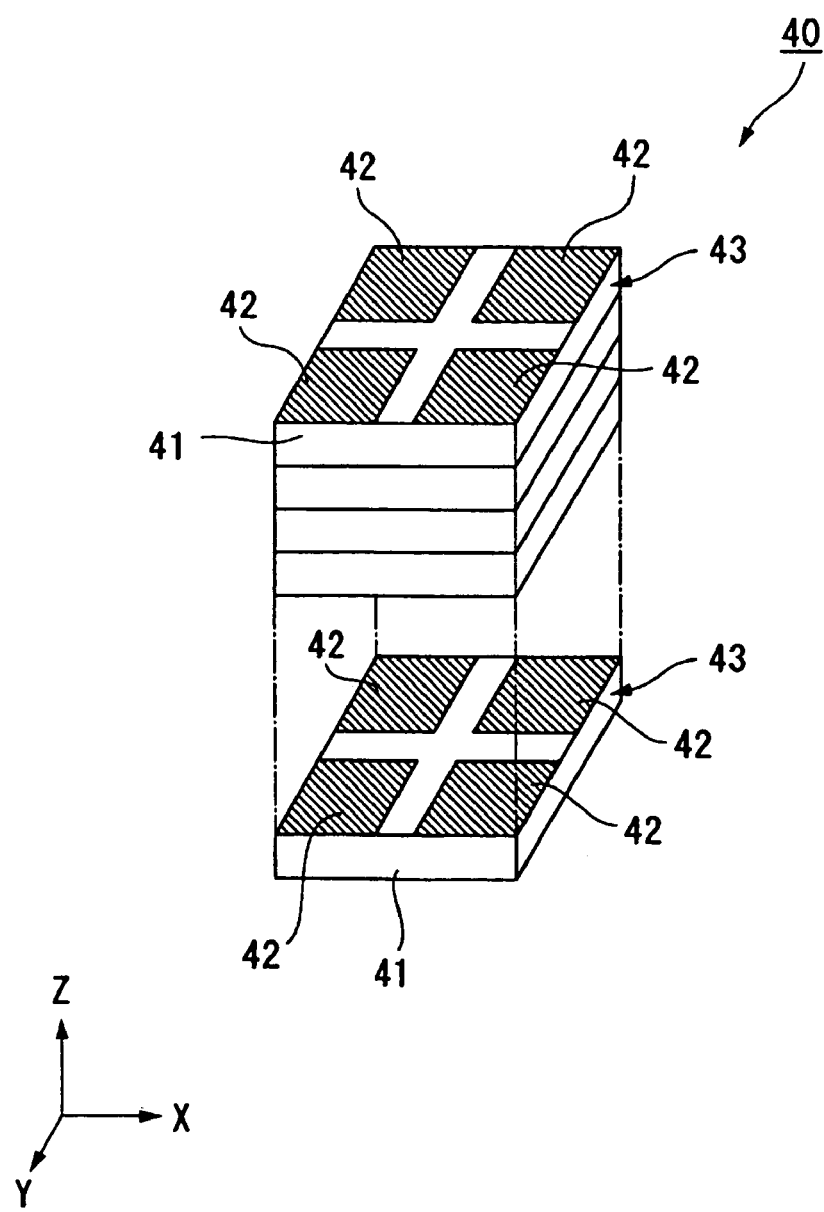
FIG. 10 is a view showing a third embodiment of a scanning probe microscope (surface information measuring apparatus) according to the invention and is a perspective view showing an example of a stack type Z actuator.

As shown by FIG. 10, the stack type Z actuator 40 is provided with a plurality of layers of piezoelectric elements 43 each having the piezoelectric member 41 in a sheet-like shape arranged along a face in parallel with the sample surface B (along XY directions) and capable of being elongated and contracted in Z direction, and 4 (a plurality of) pair electrodes 42 divided to be arranged respectively electrically independently at least at 3 or more of sections of both faces of the piezoelectric member 41 in a state of laminating respectives of the pair electrodes 42. The plurality of piezoelectric elements 43 are wired among layers electrically via the respective pair electrodes 42.

Further, according to the embodiment, the individual voltage generators 25 are respectively electrically connected to 4 of the pair electrodes 42 and are made to be able to apply voltages having different amounts simultaneously.

Further, the controlling apparatus 6 is made to control the applying means 5 to apply voltages by previously determined rates of voltage applying amounts such that elongating and contracting amounts of the piezoelectric member 41 brought into contact with 4 of the pair electrodes 42 respectively become the same.

Further, the applied amount setting step of the embodiment is a step of setting the rates of the voltage applying amounts applied to the respective pair electrodes 42 such that the elongating or contracting amounts of the piezoelectric member 41 brought into contact with 4 of the pair electrodes 42 respectively become the same, and the voltage applying step is a step of respectively simultaneously applying the voltages in accordance with the rates of the voltage applying mounts set by the applying amount setting step to 4 of the pair electrodes 42.

Also in the case of the embodiment, similar to the first embodiment, the piezoelectric member 41 is divided into 4 (a plurality) regions in accordance with a number of the pair electrodes 42 and the elongating and contracting amounts for elongating and contracting the respective regions in Z direction can be controlled. Therefore, even when piezoelectric sensitivities of the piezoelectric member 41 differ depending on the locations, by controlling the applying means 5 such that the voltages in accordance with the rates of the voltage applying amounts set by the controlling apparatus 6 are respectively simultaneously applied to 4 of the pair electrodes 42, that is, by applying the voltages in accordance with the piezoelectric sensitivities of the respective regions, the elongating and contracting amounts of the respective regions directed in Z direction can be made to be the same. Thereby, the linearity of the total of the stack type Z actuator 40 is promoted and the stack type Z actuator 40 can be elongated and contracted straight. As a result, similar to the first embodiment, cross talk in XY directions can be nullified as less as possible and various information of the sample A can be measured with high accuracy.

Next, an explanation will be given of a fourth embodiment of a surface information measuring apparatus and a surface information measuring method according to the invention in reference to FIG. 11. Further, constitutions of the fourth embodiment the same as those of the first embodiment are attached with the same notations and an explanation thereof will be omitted.

A point of the fourth embodiment which differs from the first embodiment resides in that although according to the first embodiment, the cantilever 2 is moved by a small amount in Z direction by the Z element 4 having the piezoelectric member 20 in the cylindrical shape, according to the scanning probe microscope 50 of the fourth embodiment, the sample A is moved by a small amount in Z direction by at least 3 or more of a plurality of Z actuators 51 to be proximate to and remote from the stylus 2a.

Figure 11:
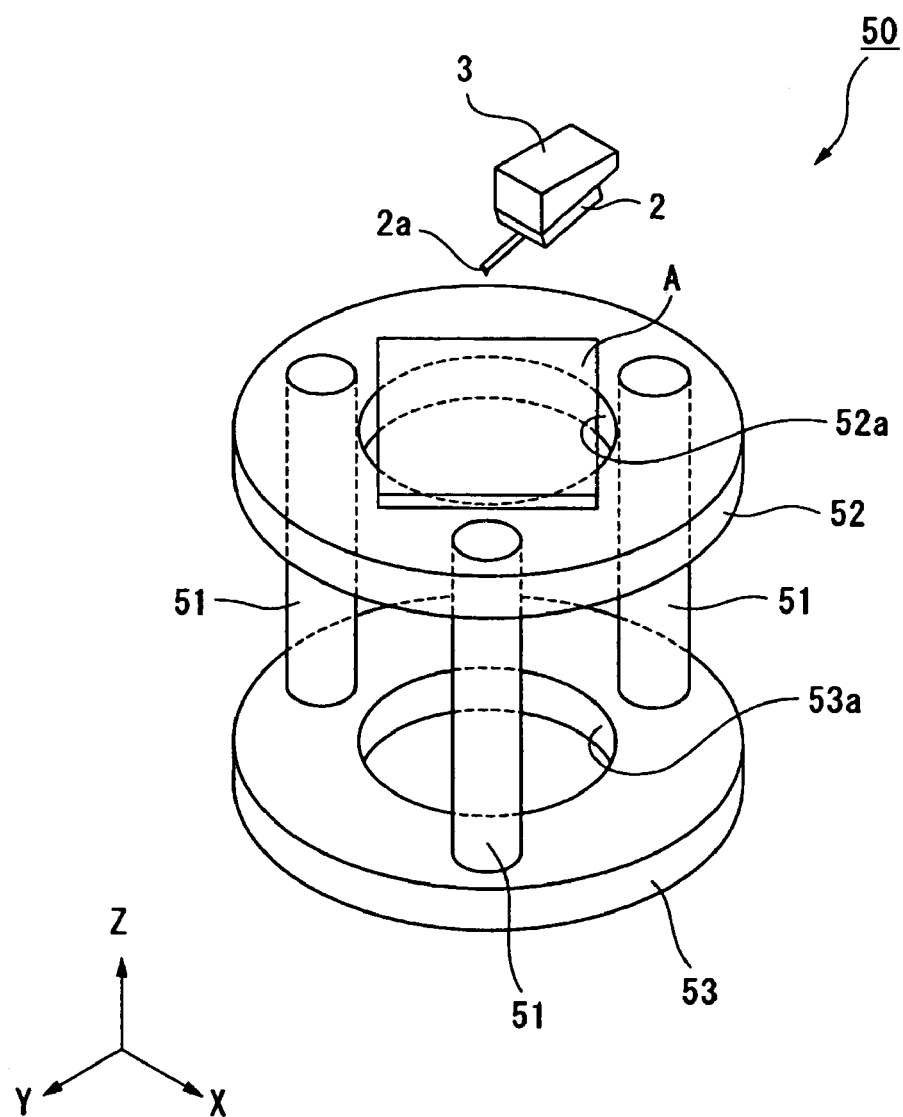
FIG. 11 is a total constitution view showing a fourth embodiment of a scanning probe microscope (surface information measuring apparatus) according to the invention.
Figure 12:
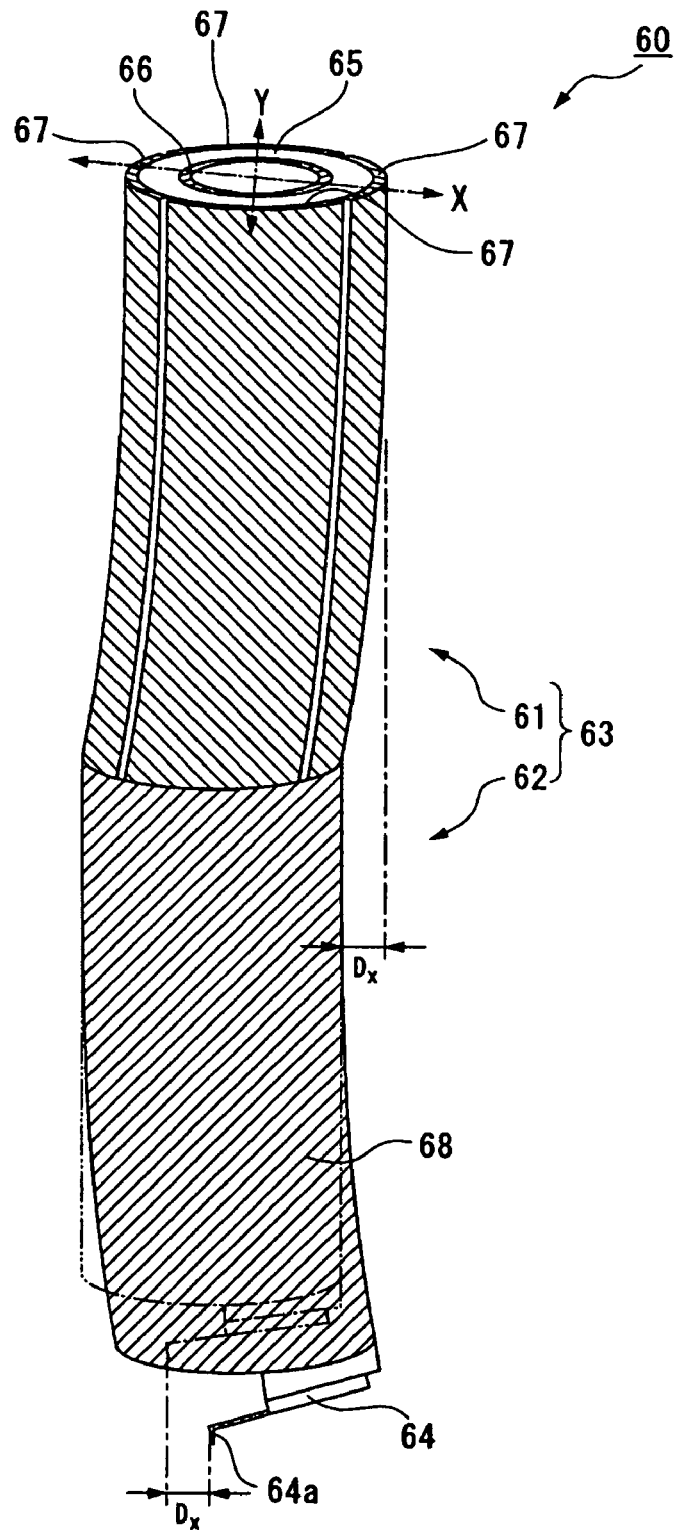
FIG. 12 is a view showing an example of a tube type piezoelectric scanner of a scanning probe microscope of a related art.
Figure 13:
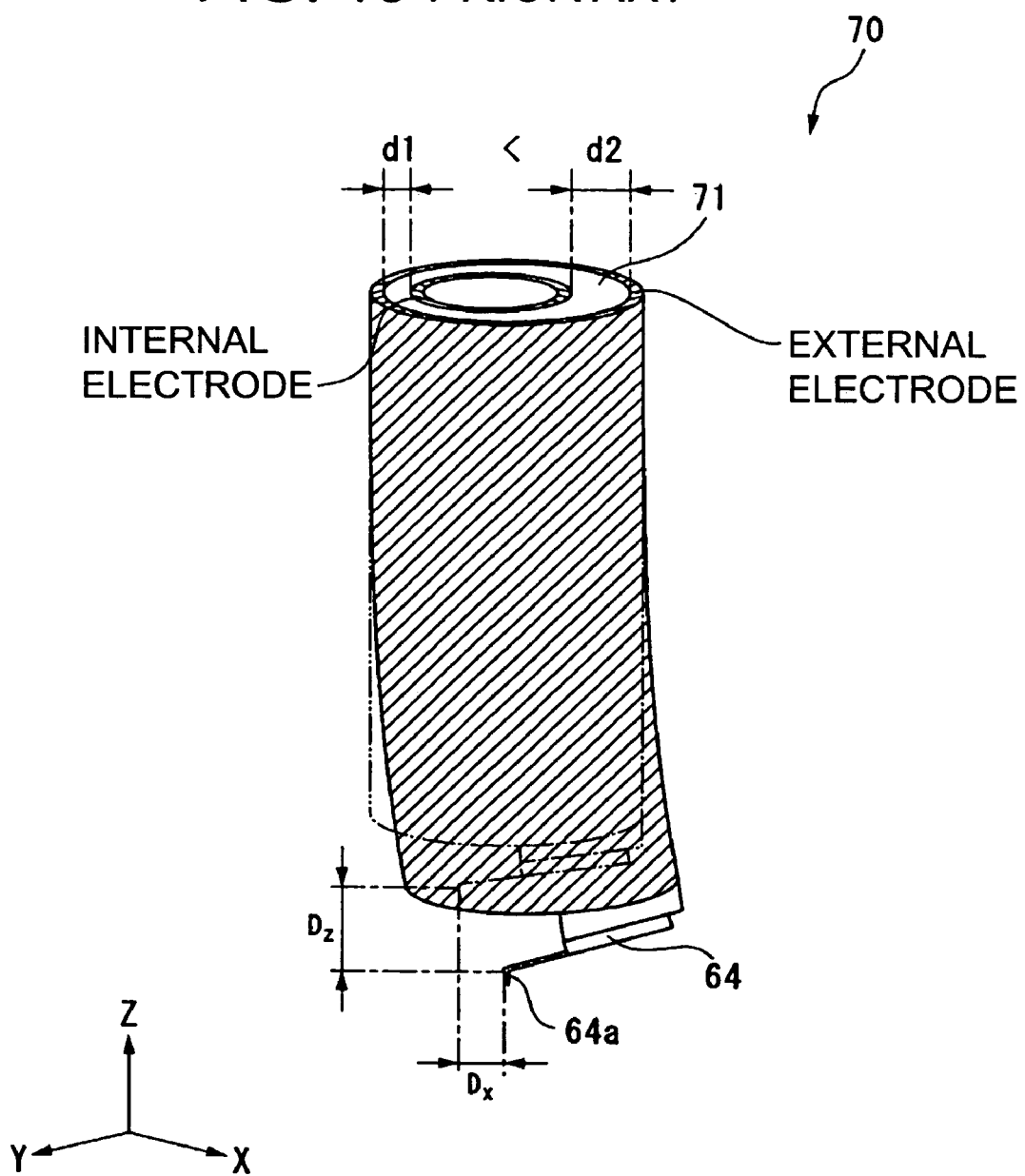
FIG. 13 is a view of a Z driving tube actuator of a related art showing a state of producing cross talk in XY directions by an eccentric tube type piezoelectric member when operated in Z direction.
Figure 14:
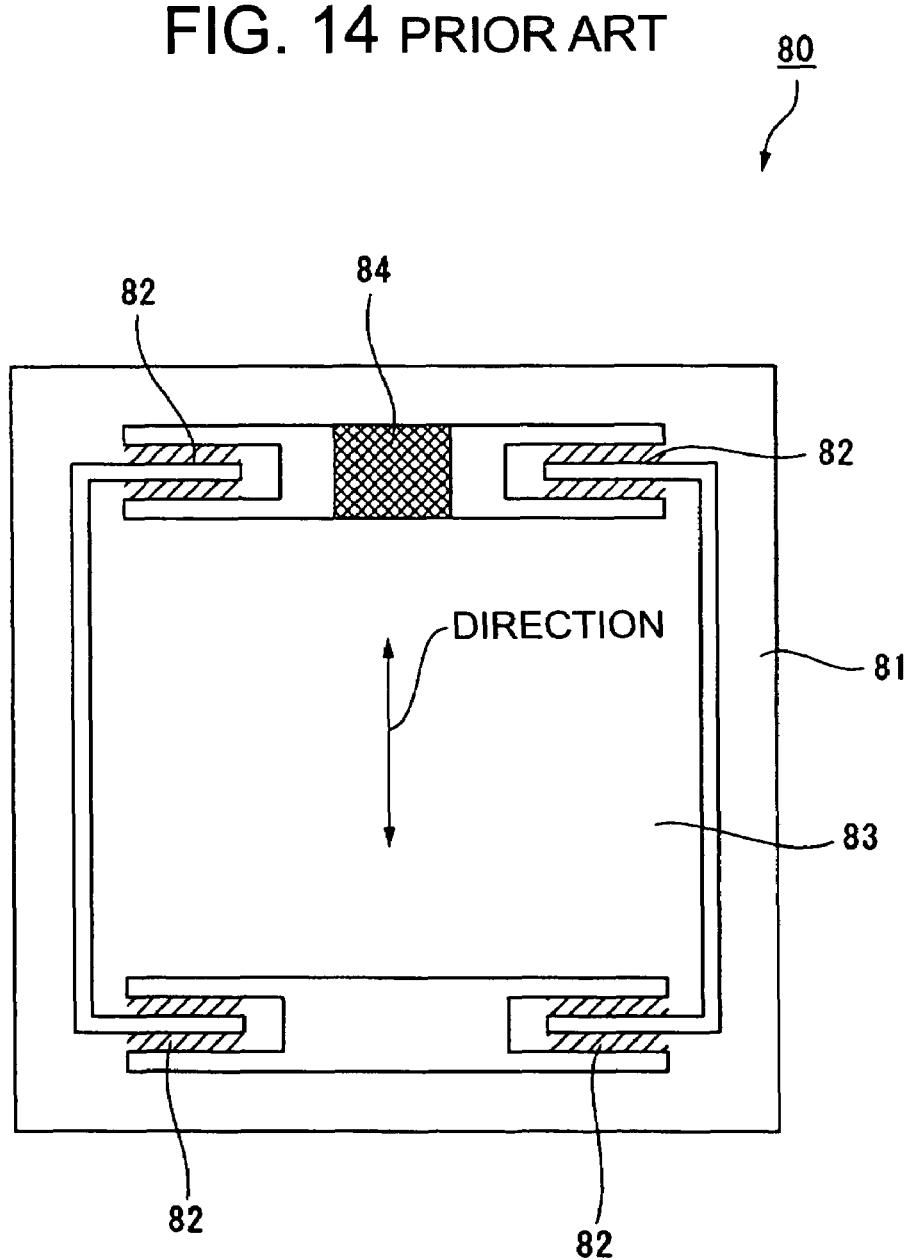
FIG. 14 is a view showing an example of a parallel spring type scanner of a related art.

That is, as shown by FIG. 11, the scanning probe microscope 50 of the embodiment is provided with an upper plate (mounting base) 52 in a flat plate shape mounted with the sample A at an upper face thereof and arranged along a face in parallel with the sample surface B (along XY directions), and three Z actuators 51 supporting the upper plate 52 from a lower face side and making the sample surface B proximate to and remote from the cantilever 2 by being elongated and contracted in Z direction orthogonal to the sample surface B when applied with the voltages.

Further, the three Z actuators 51 are provided on a lower plate 53 and are provided to be interposed between the lower plate 53 and the upper plate 52. Further, the upper plate 52 and the lower plate 53 are formed with openings 52a, 53a in a circular shape at centers thereof to constitute a ring-like shape. Further, the sample A is arranged to cover the opening 52a at the upper face of the upper plate 52.

Further, the three actuators may be actuators each having the piezoelectric member 20 in the cylindrical shape as in the first embodiment or may be actuators each having the piezoelectric member 41 in the sheet-like shape as in the third embodiment.

Further, according to the embodiment, the applying means 5 is made to be able to apply voltages having different amounts to respectives of 3 of the Z actuators 51 and the controlling apparatus 6 is made to control the applying means 5 to apply voltages by previously determined rates of voltage applying amounts such that elongating and contracting amounts of the three actuators 51 are respectively become the same.

Further, the applying amount setting step of the embodiment is a step of setting the rates of the voltage applying amounts applied to the three actuators such that the elongating and contracting amounts of 3 of the Z actuators 51 respectively become the same and the voltage applying step is a step of respectively simultaneously applying the voltages in accordance with the rates of the voltage applying amounts set by the applying amount setting step to 3 of the Z actuators 51.

Also in the case of the embodiment, similar to the first embodiment, the elongating and contracting amounts of elongating and contracting the respective Z actuators 51 in Z direction can be controlled. Therefore, the linearity of the total of the three Z actuators 51 is promoted and the Z actuators 51 can be elongated and contracted straight in Z direction. As a result, the upper plate 52 and the sample A supported by the three actuators can be moved straight in Z direction to be proximate to and remote from the cantilever 2. As a result, similar to the first embodiment, cross talk in XY directions can be nullified as less as possible and various information of the sample A can be measured with high accuracy.

Further, the scanning probe microscope 50 of the embodiment may be combined with, for example, an inverted optical microscope.

For example, the openings 52a, 53a of the upper plate 52 and the lower plate 53 may be arranged to combine with an object lens or the like. In this way, the embodiment may be compounded with other function.

Further, the technical range of the invention is not limited to the above-described embodiments but can variously be changed within the range not deviated from the gist of the invention.

For example, although according to the above-described respective embodiments, as an example of the surface information measuring apparatus, the scanning probe microscope is adopted, surface information measuring apparatus is not limited thereto but may be an apparatus of measuring surface information of the sample surface or various physical information (for example, electric constant, magnetized state, permeability, viscoelasticity, friction coefficient or the like). For example, the surface information measuring apparatus may be a surface roughness meter, a hardness meter, or an electrochemical microscope.

Further, although according to the first embodiment through the third embodiment, the piezoelectric member is divided into 4 regions in accordance with the number of the external electrodes, the number is not limited to 4 but may at least 3 or more. When the number is at least 3, the Z element or the stack type Z actuator can be displaced to direct in 2 directions of XY directions to cancel XY cross talk by ensuring 2 pieces of vectors and can be elongated and contracted firmly straight to direct in Z direction.

Particularly, by providing 3 or more of the electrodes, the piezoelectric member can be divided in more contact regions and the number of capable of controlling the elongating contracting amounts in Z direction can be increased. Therefore, the constitution is further preferable since the linearity in Z direction can further be promoted.

Although according to the first embodiment and the second embodiment, the external electrodes are brought into a state of being arranged uniformly in the peripheral direction, the external electrodes are not limited to be arranged uniformly.

Further, in the above-described respective embodiments, respective power sources may electrically be connected to the respective electrodes. However, by constructing a constitution of distributing power from the single Z power source to be able to apply voltages to individual electrodes, low cost formation can be achieved and therefore, the constitution is more preferable.

Further, the method of measuring the piezoelectric sensitivity distributions of the piezoelectric member is not limited to those of the first embodiment and the second embodiment but the piezoelectric sensitivity distribution may be measured by other method. For example, although according to the second embodiment, the piezoelectric sensitivities of the respective contact regions are respectively measured by irradiating light to the mirror, the piezoelectric sensitivities may be provided by pasting strain gages to the respective contact regions and measuring outputs of the strain gages without using the optical type utilizing the mirror.

Further, although according to the above-described first embodiment, a section of the piezoelectric member is constituted by a circular shape, the section may be constituted by a shape other than a circle so far as the section is in the cylindrical shape. Further, a portion of the shape may be provided with a deformed portion of a notch, a hole or the like.

Further, although the XY element is made to constitute the moving means in the first embodiment and the second embodiment, mentioned above, the invention is not limited thereto but the sample side may be constituted to be movable in XY directions.

Further, although there is constructed the constitution of separating the Z element and the XY element in the first embodiment and the second embodiment, there may be constructed a constitution of integrating the Z element and the XY element. For example, by making the controlling apparatus control the applying means to apply voltages having polarities inverse to each other to the opposed external electrodes, one side of the piezoelectric member is elongated and other side thereof is contracted. Thereby, the piezoelectric member is operated as the XY element scanning in XY directions. Further, by applying the voltages having the same polarity to all of the external electrodes, all of the external electrodes are elongated and contracted in Z direction to operate as the Z element. By superposing to input XY instruction and Z instruction in this way, the invention functions as a scanner of 3 axes of XYZ. The invention is applicable to also a scanner constituted in this way.

What is claimed is:

1. A surface information measuring apparatus which is a surface information measuring apparatus for measuring shape information of a sample surface or physical information of a sample by making a stylus proximate to or brought into contact with the sample surface, said surface information measuring apparatus comprising:
    a probe having the stylus at a front end thereof and arranged on an upper side of the sample;
    a Z actuator fixed with the probe at a front end thereof for making the probe proximate to or remote from the sample surface by being elongated or contracted in a Z direction orthogonal to the sample surface when the Z actuator is applied with a voltage;
    applying means for applying the voltage to the Z actuator; and
    controlling means for controlling to operate the applying means;
    wherein the Z actuator includes a piezoelectric member having a section in a cylindrical shape and formed by being elongated in the Z direction and capable of being elongated or contracted in the Z direction, and a plurality of divided electrodes provided to be respectively electrically independent from each other in a state of being divided by at least 3 or more in a peripheral direction at an inner peripheral face or an outer peripheral face of the piezoelectric member for applying the voltages to elongate or contract the piezoelectric member in the Z direction within ranges of regions brought into contact therewith;
    wherein the applying means are made to be able to apply simultaneously the voltages of amounts respectively different from each other to the plurality of divided electrodes; and
    wherein the controlling means controls the applying means to apply the voltages by previously determined rates of voltage applying amounts such that elongating or contracting amounts of respective contact regions of the piezoelectric member respectively brought into contact with the plurality of divided electrodes respectively become the same.

2. The surface information measuring apparatus according to claim 1, further comprising:
    displacement measuring means for measuring a displacement amount and direction of the vicinity of the front end of the Z actuator in XY direction orthogonal to the Z direction by applying the same amount of the voltage to a plurality of divided electrodes;
    wherein the controlling portion sets the voltage applying amounts based on a measurement result measured by the displacement measuring means.

3. The surface information measuring apparatus according to claim 1, wherein the controlling portion sets the rates of the voltage applying amounts based on a measurement result of respectively measuring piezoelectric sensitivities of the contact regions of the piezoelectric member brought into contact with a plurality of divided electrodes by applying the same amount of the voltage to respectives of the plurality of divided electrodes.

4. The surface information measuring apparatus according to claim 1, wherein the plurality of divided electrodes are arranged uniformly in the peripheral direction of the piezoelectric member.

5. The surface information measuring apparatus according to claim 1, further comprising:
    moving means for moving the probe and the sample relative to each other to direct to the direction in parallel with the sample surface.

6. A surface information measuring method which is a surface information measuring method of measuring shape information of a sample surface or physical information of a sample in a state of applying a voltage to elongate or contract in a Z direction a Z actuator including a piezoelectric member having a section in a cylindrical shape, formed to elongate in the Z direction orthogonal to the sample surface and capable of being elongated or contracted in the Z direction, and a plurality of divided electrodes provided to be respectively electrically independent from each other in a state of being divided at least by three or more in a peripheral direction at an inner peripheral face or an outer peripheral face of the piezoelectric member for applying the voltage to the piezoelectric member to elongate or contract in the Z direction within ranges of regions brought into contact therewith and fixed with a stylus arranged on an upper side of the sample at a front end thereof and making the stylus proximate to or brought into contact with the sample surface, said surface information measuring method comprising:
    an applying amount setting step of setting ratios of voltage applying amounts applied to the respective divided electrodes such that elongating or contracting amounts of respective contact regions of the piezoelectric member brought into contact with the plurality of divided electrodes respectively become the same; and
    a voltage applying step of respectively simultaneously applying the voltages in accordance with the rates of the voltage applying amounts set by the applying amount setting step to the plurality of divided electrodes.

7. The surface information measuring method according to claim 6, wherein the applying amount setting step includes:
    a displacement measuring step of measuring a displacement amount and direction of a vicinity of the front end of the Z actuator in XY directions orthogonal to the Z direction by applying once the same amount of the voltages to the plurality of divided electrodes; and
    a setting step of setting the rates of the voltage applying amounts based on a result of the measurement after the displacement measuring step.

8. The surface information measuring method according to claim 6, wherein the applying amount setting step includes:
    a sensitivity measuring step of respectively measuring piezoelectric sensitivities of the piezoelectric member brought into contact with the plurality of divided electrodes by once applying the same amount of the voltages to respectives of the plurality of directed electrodes; and
    a setting step of setting the rates of the voltage applying amounts based on a result of the measurement after the sensitivity measuring step.

9. The surface information measuring method according to claim 6, further comprising:
    a scanning step of moving the probe and the sample relative to each other to be directed in a direction in parallel with the sample surface.

* * * * *